United States Patent [19]

Mallary

[11] Patent Number: 5,103,553
[45] Date of Patent: Apr. 14, 1992

[54] METHOD OF MAKING A MAGNETIC RECORDING HEAD

[75] Inventor: Michael Mallary, Berlin, Mass.

[73] Assignee: Digital Equipment Corporation, Mass.

[21] Appl. No.: 660,211

[22] Filed: Feb. 20, 1991

Related U.S. Application Data

[60] Continuation of Ser. No. 443,514, Jan. 28, 1989, abandoned, which is a division of Ser. No. 79,117, Jul. 29, 1987, Pat. No. 4,907,113.

[51] Int. Cl.$^5$ ............................................. G11B 5/42
[52] U.S. Cl. ................................. 29/603; 360/113; 360/119; 360/121; 360/127
[58] Field of Search ............... 29/603; 360/113, 110, 360/119, 121, 127, 125

[56] References Cited

U.S. PATENT DOCUMENTS

| | | | |
|---|---|---|---|
| 3,686,751 | 8/1972 | Sugiyama | 29/603 |
| 3,921,217 | 11/1975 | Thompson | 360/113 |
| 3,943,570 | 3/1976 | Yamamoto et al. | 360/112 |
| 4,151,574 | 4/1979 | Gerkema et al. | 360/113 |
| 4,195,323 | 3/1980 | Lee | 360/113 |
| 4,374,403 | 2/1983 | Oshida et al. | 360/113 |
| 4,489,357 | 12/1984 | Van Ooijen et al. | 360/113 |
| 4,626,946 | 12/1986 | Vinal | 360/113 |
| 4,639,811 | 1/1987 | Diepers et al. | 360/125 |
| 4,644,432 | 2/1987 | Heim | 360/123 |
| 4,652,954 | 3/1987 | Church | 360/120 |
| 4,656,546 | 4/1987 | Mallary | 360/110 |
| 4,672,493 | 6/1987 | Schewe | 360/125 |
| 4,713,710 | 12/1987 | Soda et al. | 360/121 |
| 4,727,643 | 3/1988 | Schewe et al. | 29/603 |

FOREIGN PATENT DOCUMENTS

| | | | |
|---|---|---|---|
| 57-164416 | 10/1982 | Japan | 360/112 |
| 61-68713 | 4/1986 | Japan | 360/113 |
| 62-26612 | 2/1987 | Japan | 360/113 |
| 2149186 | 5/1985 | United Kingdom | 360/113 |

*Primary Examiner*—Carl E. Hall
*Attorney, Agent, or Firm*—Fish & Richardson

[57] ABSTRACT

The head includes a read pole disposed between a pair of write poles spaced apart to form a gap therebetween. The read pole conducts flux to a flux sensor that is located away from the gap. The head can be utilized for both longitudinal and perpendicular recording and the readback function can be carried out by an inductive coil or flux sensing devices such as a Hall sensor or an MR sensor. The recording head achieves high readback resolution, high write field gradients, and the capability for write wide-read narrow. The read pole and write poles are laminated structures.

13 Claims, 2 Drawing Sheets

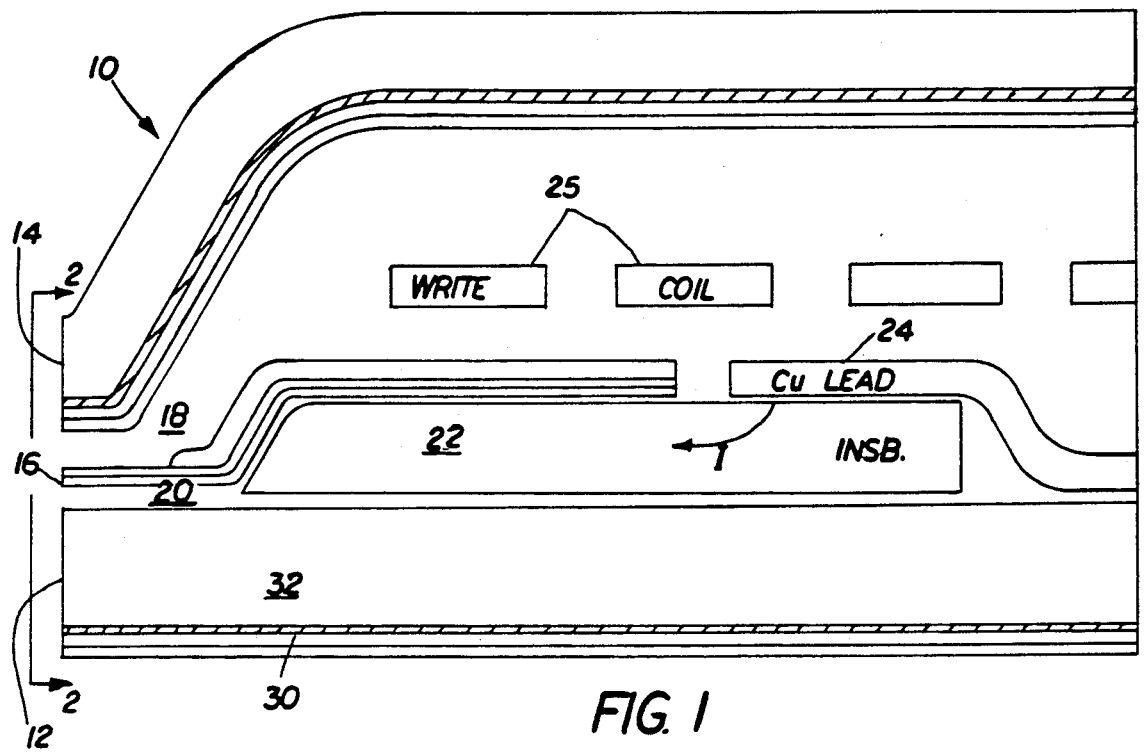
FIG. 1
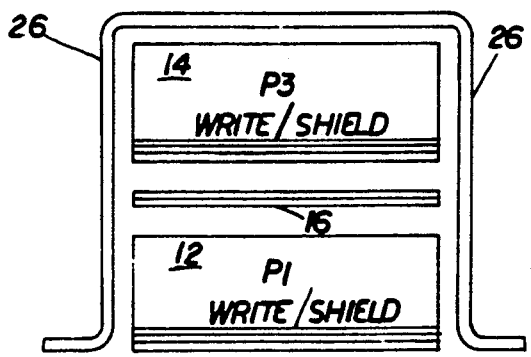
FIG. 1a
FIG. 2a
FIG. 2

METHOD OF MAKING A MAGNETIC RECORDING HEAD

This application is a continuation of application Ser. No. 07/443,514, filed Nov. 28, 1989, now abandoned which is a divisional of application Ser. No. 07/079,117, filed July 29, 1987, which issued on Mar. 6, 1990 as U.S. Pat. No. 4,907,113.

BACKGROUND OF THE INVENTION

This invention relates to a three-pole magnetic recording head.

Both perpendicular and longitudinal recording techniques are used for recording and reading back data stored in a magnetic medium. In perpendicular recording the prior art consists mainly of monopole read-write heads on soft underlayer media or two-pole heads with and without soft underlayers. Both such heads have low write field gradients. It is known that low field gradients can be ameliorated by a shielded write pole. Prior approaches also suffer from relatively wide readback pulse widths. In longitudinal recording the prior art consists of two pole heads and MR (magneto resistive) heads with an MR element in the gap between the two poles. Having an MR element in the gap, however, imposes geometric constraints on track width and sensor thickness.

SUMMARY OF THE INVENTION

The magnetic recording head according to the invention includes a read pole disposed in a gap between a pair of write poles. The read pole conducts flux to a remotely located flux sensor. The flux sensor may be an MR (magneto resistive), Hall, or inductive sensor.

In a preferred embodiment, the sensor includes side shields and the read and write poles are laminated. The read pole laminant includes a thin non-magnetic layer disposed between magnetic layers.

The magnetic recording head has optimized read and write properties with fewer process steps than would be required if separate read and write heads were utilized. The head is capable of both perpendicular and longitudinal read/write from a single architecture and provides a high write field gradient in perpendicular write (narrow written transitions). The large write gap coupled with the small read gap in longitudinal read/write gives high overwrite and good readback resolution. The laminated read pole provides good domain structure at narrow track widths. An important aspect of the invention is the remote readback sensor location which allows for narrow track sensor optimization. The write wide, read narrow aspect of the invention controls fringing with track following runout and narrow readback pulses result in high linear bit density. The flexibility of the architecture of the head allows for the use of either inductive, Hall, or MR sensors to detect the signal on the read pole.

The readback resolution of the head is high relative to a two pole head. For the same effective gap a two-pole flux sensing head would get 18% resolution as compared to 70% resolution for the three pole head of the invention. The signal strength of the head is high as compared with an equivalent two pole head. In particular, the gain in signal strength at the highest operating frequency is approximately a factor of four. Because the signal from the three pole head does not need to be differentiated as is the case with two pole heads, less signal processing noise is induced. The gain in signal combined with the reduction in noise give a net signal to noise gain of about x7. The three pole head also optimizes the write process both for longitudinal and perpendicular recording. For longitudinal recording, the relatively large write gap gives high overwrite and for perpendicular recording the shielded pole gives narrow written transitions.

BRIEF DESCRIPTION OF THE DRAWING

FIG. 1 is a cross sectional view of a recording head using a Hall sensor;

FIG. 1a is a schematic illustration of ferromagnetic laminated seed layers for write poles;

FIG. 2 is a cross sectional view taken along the line 2—2 of FIG. 1;

FIG. 2a is a schematic illustration of a laminated ferromagnetic seed layer for the read pole;

DESCRIPTION OF THE PREFERRED EMBODIMENT

Figure 3:
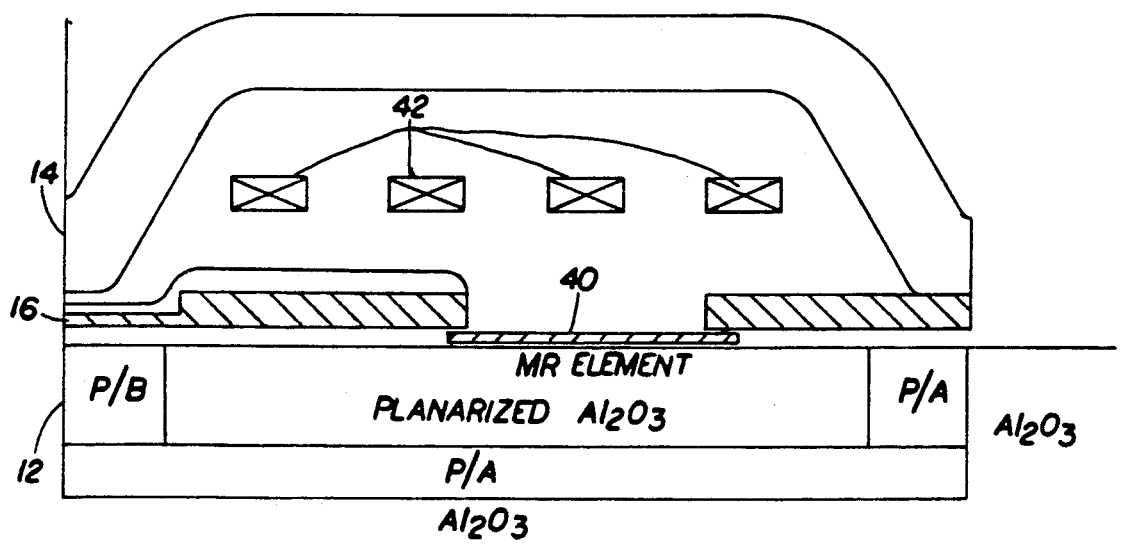
FIG. 3 is a cross-sectional view of the invention employing a MR flux sensing element.

With reference first to FIG. 1, a three pole head 10 suited for longitudinal recording includes write poles 12 and 14 and a read pole 16. The write poles 12 and 14 are separated from the read pole 16 to form gaps 18 and 20. The read pole 16 conducts magnetic flux to a Hall sensor 22 which is made of indium antimonide. The Hall sensor 22 is connected to a copper lead 24 which provides some current. Leads to conduct an electrical signal from the Hall sensor 22 to electronics are not shown. A write coil 26 is provided for writing in conjunction with the write poles 12 and 14. As shown in FIG. 2, a saturable side shield 26 is provided to suppress adjacent track fringing interference during read. The shield 26 saturates during write and is therefore effectively not present. The shield 26 is thin, having a thickness of approximately three microinches.

The recording head 10 is made in the following way. The write pole 12 begins with a laminated seed layer structure 30, the details of which are shown in FIG. 1a. A 50 Angstrom thick layer of $Al_2O_3$ is disposed between 750 Angstrom layers of NiFeCo. The next layer is 1,000 Angstrom $Al_2O_3$ followed by a 750 Angstrom layer of NiFe or NiFeCo. The seed layer structure 30 provides narrow track domain control. A 20,000 Angstrom thick layer of NiFe or NiFeCo 32 is deposited over the seed layer structure 30 by through mask plating or sheet vacuum deposition followed by ion milling to leave the write pole 12. The indium antimonide Hall element 22 is next formed. The read pole 16 is formed by depositing another laminated ferromagnetic seed layer structure as shown in FIG. 2a along with a yoke structure that connects to the Hall sensor 22. The structure is ion milled to form the read pole 16. A non-magnetic buffer layer (e.g., hard bake photoresist) is deposited over the read pole 16 to minimize the leakage of flux from the read pole 16. The write coil 26 is formed at this time. A third magnetic seed layer laminate structure 30 as shown in FIG. 1a is deposited to form the other write pole 14. The pole 14 works with the pole 12 during write and shields the read pole 16 (with the help of the pole 12) during read. A thin ceramic layer (not shown) is deposited over the recording head 10 over which is deposited a thin ferromagnetic layer which is patterned to form the saturable side shield 26.

FIG. 3 illustrates an embodiment of the present invention utilizing an MR element 40 which connects two portions of the read pole 16. The MR element 40 rests on a planarized $Al_2O_3$ layer. As in the embodiment of FIG. 1 write coils 42 are provided. The MR element 40 is typically a thin film of NiFe. A bismuth MR element will also work with a geometry similar to that in FIG. 1.

Figure 4:
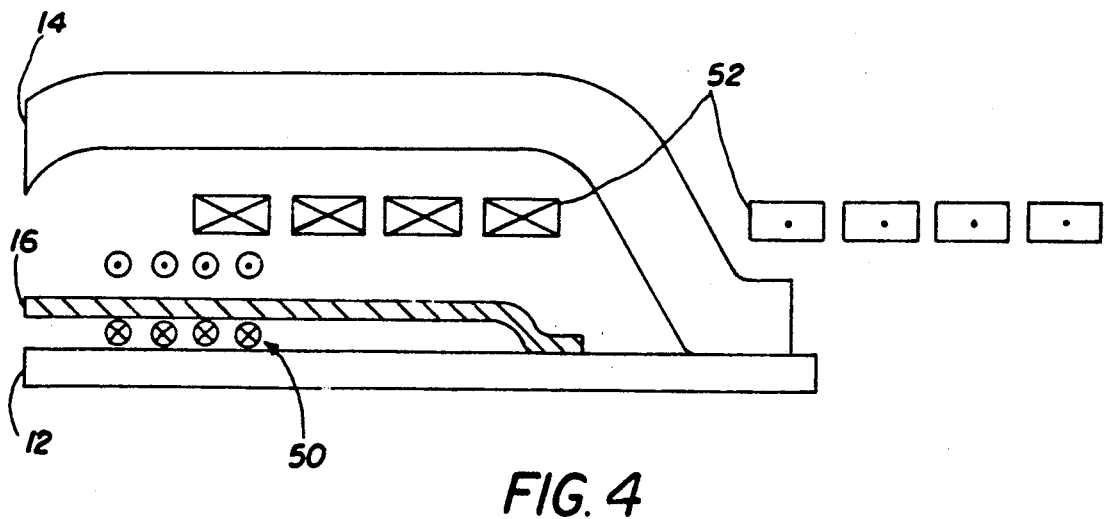
FIG. 4 is a cross sectional view of the invention employing an inductive coil as a flux sensor.

FIG. 4 shows an embodiment of the invention using an inductive coil 50 surrounding the read pole 16. Writing is effected by means of a write coil 52.

Note that in each of the embodiments, the flux sensor, whether it be the Hall element 22 of FIG. 1, the MR element 40 of FIG. 3 or the inductive coil 50 of FIG. 4, is located away from the gap between the read and write poles. The remote location of the flux sensor provides important design freedom so that performance can be optimized. The geometric constraints &:o track width and sensor thickness imposed by a sense element in the gap are thus overcome.

During readback the read pole 16 conducts flux from the media to the attached flux sensor. The write poles 12 and 14 serve as shields to keep the read flux out of the read pole 16 until the source (recorded bit) is almost directly under the read pole 16. This configuration gives a narrow readback pulse and thus allows for higher recording density (more bits per inch). The thin laminated films associated with all three poles allow for a transversely oriented domain pattern and flux conduction by rotation even for very narrow track widths. During write, the write coil 26 drives flux from the pole 12 to the pole 14 and saturates the read pole 16 so that it acts as if it were not there. The effective write gap is therefore the pole 12 to pole 14 distance whereas the effective read gap distance is about half that. Therefore, one can obtain good overwrite from the high write field while at the same time getting good resolution during readback from the effectively smaller read gap. The side shields 26 saturate during write so that they act as if they are not there. During readback, they shield the pole 16 from offtrack sources of flux. The width of the read pole 16 can be made less than the width of the write poles 12 and 14 so that the head writes wide and reads narrow to allow for tracking errors.

Because of the remote location of the flux sensor in the invention, there is a great deal of freedom in the sensor geometry configuration. Furthermore, the three-pole arrangement gives a very focused readback capability. The present design also results in much less signal processing induced noise. The three pole head performs a differentiation step in the hardware unlike the situation with two-pole heads.

What is claimed is:

1. A method for making a multi-pole magnetic recording head comprising:
   preparing a thin laminated seed layer structure comprising at least two magnetic layers separated by a non-magnetic layer,
   depositing another magnetic layer on the prepared seed layer structure by electroplating through a mask defining a pole shape, and
   removing by ion milling the laminated seed layer structure not covered by said depositing step to leave a first pole comprising coextensive laminated seed layers and said another magnetic layer.

2. The method of claim 1 wherein said step of preparing said seed layer structure comprises preparing said layer to comprise two magnetic layers separated by a non-magnetic layer that is substantially thinner than said magnetic layers.

3. The method of claim 1 wherein said step of preparing said seed layer structure comprises preparing said non-magnetic layer to be on the order of 50 Angströms thick.

4. The method of claim 1 wherein said step of preparing said seed layer structure comprises preparing said layer to comprise two layers of NiFeCo separated by a layer of $Al_2O_3$.

5. The method of claim 4 wherein said layer of $Al_2O_3$ is prepared to be on the order of 50 Angströms thick.

6. The method of claim 4 wherein said seed layer structure is further prepared to comprise a second layer of $Al_2O_3$ and a further layer comprising one of NiFe and NiFeCo.

7. The method of claim 6 wherein said step of depositing a pole includes depositing said further layer until it is on the order of 20,000 Angströms thick.

8. The method of claim 1 wherein said step depositing another magnetic layer includes depositing layer comprising one of NiFe and NiFeCo.

9. The method of claim 1 wherein said step of depositing another magnetic layer includes depositing a layer until it is the order of 20,000 Angströms thick.

10. The method of claim 1 wherein said step of depositing another magnetic layer includes depositing a layer comprising one of NiFe and NiFeCo until it is on the order of 20,000 Angströms thick.

11. The method of claim 1 further including the steps of repeating the previous steps of preparing, depositing and ion milling, to yield further poles.

12. The method of claim 11 wherein said step of repeating the previous steps is performed twice to yield a three pole head.

13. The method of claim 1 further including depositing a thin ceramic layer over the pole followed by depositing a thin ferromagnetic layer over the ceramic layer to form a saturable side shield.

* * * * *